United States Patent
Caperna et al.

[11] Patent Number: 6,087,940
[45] Date of Patent: Jul. 11, 2000

[54] ARTICLE SURVEILLANCE DEVICE AND METHOD FOR FORMING

[75] Inventors: Albert J. Caperna; Mark C. Waterbury, both of Bowling Green, Ohio

[73] Assignee: NovaVision, Inc., Bowling Green, Ohio

[21] Appl. No.: 09/330,808

[22] Filed: Jun. 11, 1999

Related U.S. Application Data

[60] Provisional application No. 60/094,421, Jul. 28, 1998, and provisional application No. 60/124,984, Mar. 18, 1999.

[51] Int. Cl.⁷ ..................................................... G08B 13/14
[52] U.S. Cl. ......................... 340/572.5; 29/846; 156/269; 427/96; 428/209
[58] Field of Search ............................. 340/572.5, 572.7, 340/825.34; 343/895; 156/52, 269; 29/846, 829; 428/457, 209; 427/96

[56] References Cited

U.S. PATENT DOCUMENTS

| | | | |
|---|---|---|---|
| 3,913,219 | 10/1975 | Lichtblau | 29/25.42 X |
| 3,938,044 | 2/1976 | Lichtblau | 340/572.3 |
| 4,369,557 | 1/1983 | Vandebult | 29/25.42 |
| 4,802,944 | 2/1989 | Benge | 156/247 |
| 4,818,312 | 4/1989 | Benge | 156/52 |
| 4,846,922 | 7/1989 | Benge et al. | 156/324 |
| 5,370,763 | 12/1994 | Curiel | 156/277 |
| 5,446,447 | 8/1995 | Carney et al. | 340/572.4 |
| 5,457,461 | 10/1995 | Schuermann | 342/42 |
| 5,464,690 | 11/1995 | Boswell | 428/334 |
| 5,500,651 | 3/1996 | Schuermann | 342/42 |
| 5,574,431 | 11/1996 | McKeown et al. | 340/572.3 |
| 5,574,470 | 11/1996 | de Vall | 343/895 |
| 5,595,624 | 1/1997 | Curiel | 156/277 |
| 5,608,417 | 3/1997 | de Vall | 343/895 |
| 5,654,693 | 8/1997 | Cocita | 340/572.1 |
| 5,658,411 | 8/1997 | Faykish | 156/233 |
| 5,682,143 | 10/1997 | Brady et al. | 340/572.7 |
| 5,683,774 | 11/1997 | Faykish et al. | 428/40.1 |
| 5,689,263 | 11/1997 | Dames | 342/51 |
| 5,695,860 | 12/1997 | Imaichi et al. | 428/209 |
| 5,751,256 | 5/1998 | McDonough et al. | 343/873 |
| 5,841,350 | 11/1998 | Appalucci et al. | 340/572.5 X |

*Primary Examiner*—Thomas Mullen
*Attorney, Agent, or Firm*—Emch, Schaffer, Schaub & Porcello, Co., L.P.A.

[57] ABSTRACT

A security tag and method for forming the tag in a substantially continuous in-line operation. The tag includes a substrate with first and second conductive elements separated by a dielectric layer and means establishing electrical contact between the first and second conductive elements. The means for establishing electrical contact includes utilizing an electrically conductive ink or providing an interruption in the dielectric layer. Under one embodiment a layer of foil having a series of interruptions is further provided.

29 Claims, 10 Drawing Sheets

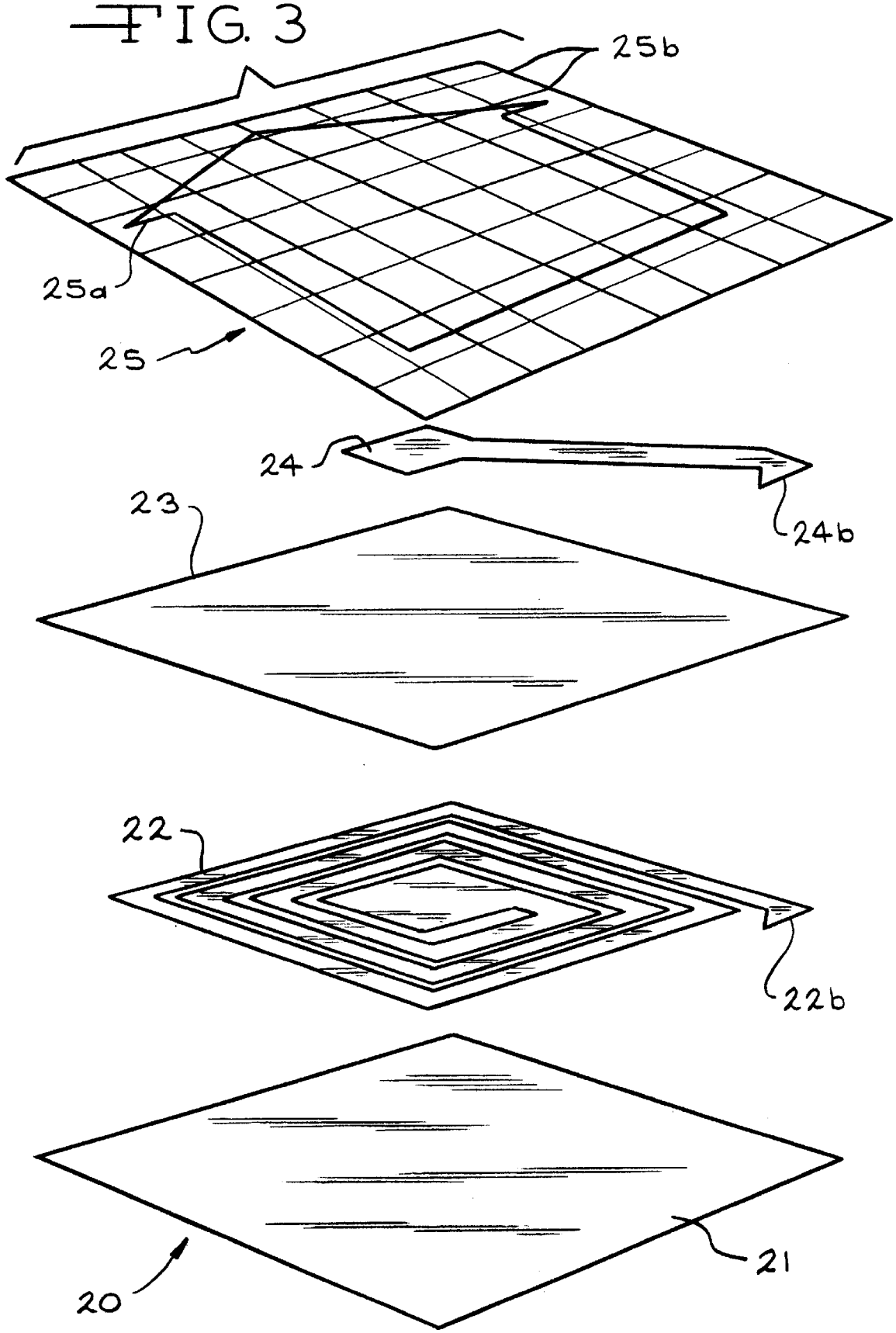

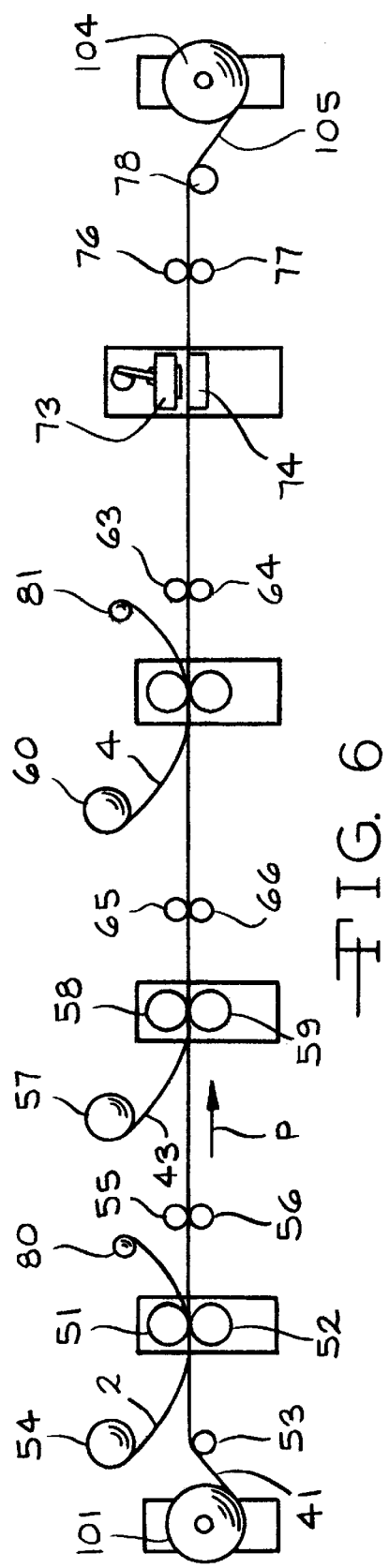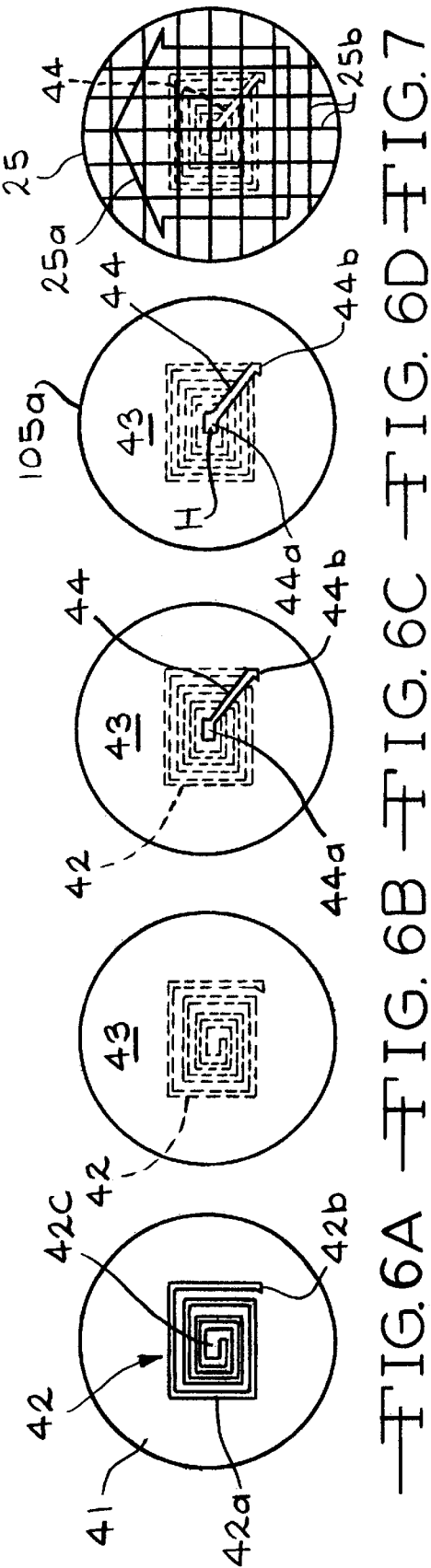

ARTICLE SURVEILLANCE DEVICE AND METHOD FOR FORMING

CROSS-REFERENCE TO RELATED APPLICATIONS

The present application is related to Provisional Applications Serial Nos. 60/094,421 filed Jul. 28, 1998 and 60/124,984 filed Mar. 18, 1999.

BACKGROUND

The use of electronic/radio frequency (RF) article surveillance devices has become extremely widespread, particularly on retail products for security purposes. However, despite such widespread use, RF devices are fairly expensive, in part because they involve the manufacture of the device in one operation and, in a second, separate operation, adding other enhancements like European Article Numbering (EAN) or Universal Product Code (UPC) bar codes and holograms for product authentication purposes. Yet another operation is, then required to affix the RF tag or combined tag to merchandise or packaging materials. U.S. Pat. No. 3,938,044, incorporated herein by reference, shows one prior art device for use in an electronic security system wherein a resonant tag circuit is sensed to denote an alarm condition. The device includes an antenna system which senses the presence of a resonant tag circuit and, upon such sensing, can automatically activate a deactivation field for destruction of the resonant properties of the tag circuit at its sensing frequency and provide output indication that tag deactivation has been achieved.

Although integration of a RF EAS tag with a hologram for authentication purposes is a desirable means of conserving package real estate, the electromagnetic radiation required for the RF circuit would be occluded by the presence of an embossed hologram sheet produced by the methods described in prior art.

It is believed that the present invention incorporates advantages not available in that or any other prior art. Other patents which disclose various methods for forming an RF device or resonant tag labeling system include U.S. Pat. Nos. 3,913,219; 4,498,076; 4,846,922; 5,485,154; 5,479,172; 5,446,447; 5,500,651; 5,457,461; and 5,751,256.

DISCLOSURE OF THE INVENTION

An Electronic Article Surveillance (EAS) device incorporates various European Article Numbering (EAN) and Universal Product Code (UPC) bar codes and heterogeneous holographic effects. The method for forming disclosed herein permits the party producing the final article to incorporate the various elements in-line thereby permitting such party to retain and maintain control over all the elements in the manufacturing process and if desired to form the device in a single, on-going operation.

The article surveillance device of the present invention utilizes a composite sheet having a metal layer with a thickness preferably in the range of 20 millimicrons to 100 millimicrons and forming an RF resonating circuit with a resonance peak, for example, in the range of 7 to 9 megahertz. Utilizing the composite sheet adhered to a substrate, other elements may be directly stamped thereon in the steps of forming the final article. The metal layer of the composite sheet may be stamped to form an antenna of a radio frequency (RF) resonator. Under one embodiment, a second composite sheet is adhered to the opposite surface of the substrate. Under another embodiment, a second composite sheet is adhered to a dielectric coating placed on the opposite side of the first composite sheet from the substrate. The second composite sheet has embossed thereon one or more of (1) a holographic or kinetic image, (2) European Article Numbering (EAN) or Universal Product Code bar-code (UPC), (3) high density optical information including digitized optical commands, (4) a holographic bar code, or (5) complex script scannable by an optical scanner. The European Article Numbering or Universal product bar-code may utilize a wide variety of printed digits in the range of 1 to 1000.

The present invention provides new and unique articles of manufacture and a method for forming a RF tag or other article with a bar code and/or a holographic image directly on a substrate forming a component to be applied in-line at high speed to a product. For example the product could be photographic film package, pharmaceutical, toiletry, CD, or video cassette or any other retail item prone to pilfering, counterfeiting or parallel importing upon which it is desired to provide a RF tag.

Accordingly, it is an object of the present invention to provide a method of forming the improved RF device in which a major component is to be applied directly to the retail products or its packaging and to do so with high speed production efficiency and low cost.

It is a further object of the present invention to provide a combination sheet and method for forming such combination sheet which may be used in directly forming an electronic surveillance device which incorporates a EAN/UPC bar code and holographic image. The combination sheet may be applied at high speed directly to the substrate of the intended finished retail product or article. A composite sheet which can be adapted for use in the method and for forming the combination sheet of the present invention is disclosed in U.S. Pat. Nos. 5,464,690, 5,643,678 and 5,674,580 which are incorporated herein by reference and are hereinafter referred to as "NovaVision® composite sheet." The present invention is not, however, limited to the use of the NovaVision® composite sheet but may be, for example, implemented using conventional hot or cold stamping foils or improved conductivity stamping foil.

It is, therefore, a further object of the present invention to provide a means of forming RF EAS tags through the use of conventional stamping foils and stamping foils that have been modified to improve electrical conductivity. The accuracy of the edges of the antennas or capacitors fabricated by stamping of such foils may be enhanced in the present invention by inclusion of a step of die cutting, partial die cutting or scaring of the stamping foil prior to or during the stamping step. One advantage of die cutting is thicker layers may be used, including a thicker metal layer.

It is a further object of the present invention to provide methods for in-line tuning of RF tag frequency by changing the capacitance of the capacitor element, or the inductance of the inductor element. Information required for in-line tuning may obtained, for example, from a high-speed, in-line tag reader that measures tag resonance frequency and circuit Q and provides feedback to the printing line to control any of the parameters below, or other characteristics that influence tag resonant frequency.

The resonant frequency of a simple capacitance, inductance circuit, such as those in the present invention, is given by: Frequency $(Hz) = 1/(2\pi) * 1/(CL)^{1/2}$. Where $\pi = 3.14159 \ldots$ C=capacitance of capacitor element in Farads, and L=inductance in Henrys. The capacitance of a parallel plate capacitor element, in turn, is given by: $C = (KA)/(4\pi d)$.

Where C=capacitance in Farads, K=dielectric constant of dielectric element, A=area of the plates, d=separation between plates.

It may be seen from these formulae that the resonant circuit may be tuned to an appropriate resonant frequency by adjustment of the capacitor plate area, the spacing between capacitor plates, or the dielectric constant of the dielectric component, or any combination of these factors, in addition to other possible factors, such as the inductance of the antenna element. More specifically, such in-line tuning may be accomplished by one or more of the following:

1) Adjusting the overlap of two regions of adhesive applied in cold stamping capacitor plate fabrication. Greater overlap will reduce the area of the cold stamped capacitor thereby reducing the capacitance.
2) Control of the dielectric constant of the dielectric element of the capacitor by varying the polarity, or polarizability, of the ink mix.
3) Control of capacitance by changing thickness of dielectric element. For a printed dielectric, this may be accomplished through variations in print process parameters.
4) Control of extent of capacitor plates by printing conductive ink to extend the dimensions of the smaller of two plates forming a capacitor.
5) Control of extent of capacitor plates by laser trimming of plates.

It is a further object of the present invention to provide a means of making electrical contact between the RF antenna on one side of a printed dielectric layer, and the capacitor plate element on the other side of that layer by either of the following means:

1) Printing an overlapping layer of conductive ink over the conductors and dielectric as shown in FIGS. 4A and 4B.
2) Limiting the extent of the dielectric layer so that an electrical contact point is formed at the site of omission of the dielectric layer, as shown in FIGS. 5A and 5B.

It is a further object of the present invention to provide a combination sheet design (FIG. 3) that reduces electrical conductivity, for example by interruptions, to allow compatibility with the transmission of radio frequency energy as required for RF EAS and RF ID tag use. It is a further object of the present invention to provide a metallized foil design for packaging materials and methods for producing same that allow integration of those foils with RF EAS tags without attenuation of RF energy.

DESCRIPTION OF THE DRAWINGS

FIGS. 3, 4A, 4B, 5A and 5B show embodiments of RF EAS resonator tags formed according to the present invention.

FIG. 6 shows apparatus for in-line production of the security device of the present invention.

FIGS. 6A, 6B, 6C and 6D show the changes in the structure at each in-line station shown in FIG. 6.

FIG. 7 shows a further embodiment.

DETAILED DESCRIPTION OF THE INVENTION

Figure 1:
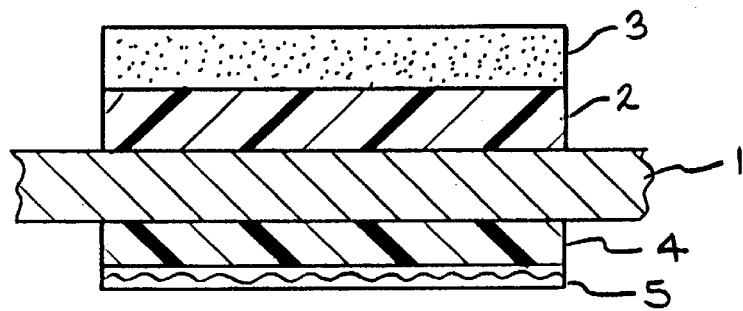
FIGS. 1 and 1A through 1E show various embodiments of the EAS device of the present invention utilizing a single layer of composite sheet or stamping foil on each side of a supporting substrate.

Referring to FIG. 1, NovaVision® composite sheet or conventional hot or cold stamping foil or high conductivity stamping foil, hereinafter referred to as first foil (2), is stamped onto a supporting substrate (1) comprising paper or a dielectric film such as oriented polypropylene or polyester. The first foil (2) is stamped such that the metal layer thereof forms the shape of an antenna for a radio frequency (RF) resonator. One form of antenna is designated by the numeral (22) in FIG. 3. The supporting substrate (1) is reversed and a second NovaVision® composite sheet, conventional hot or cold stamping foil, or high conductivity stamping foil, second foil (4), is stamped on the opposite surface of the supporting substrate (1) to the form and shape of, and to function as, a capacitor. For example, one form of capacitor is designated by the numeral (24) in FIG. 3. In those instances where the second foil (4) is formed using NovaVision® composite sheet, the capacitor formed from the metal layer thereof may then be stamped with a die to form a holographic or kinetic image (5). As will be appreciated from FIGS. 3 through 6 and the description related thereto, following the stamping operations, it is only those portions of the respective metal layers of the first foil (2) forming the resonator/antenna and second foil (4) forming the capacitor which remain on the substrate (1) and all other portions of said first foil (2) and second foil (4) are removed following the transfer of such metal layer portions. See FIG. 6. A self adhesive carrier (3) is laminated or printed on to the RF resonator/antenna stamped from the first foil (2). The adhesive carrier (3) could be, for example, a three mil double-sided tape supported by a 30 pound glassine liner available from Fasson, Inc., Stow, Ohio.

FIGS. 1A, 1B, 1C, 1D and 1E show similar layer to layer structures as that of FIG. 1 but show other features added thereto.

Figure 1A:
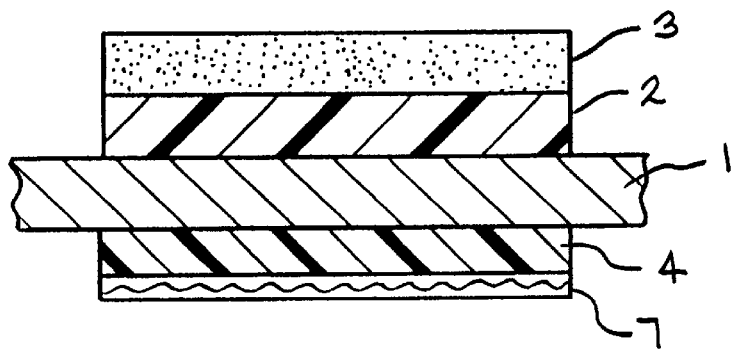

In FIG. 1A, where the second foil (4) is NovaVision® composite sheet, the capacitor stamped from the metal layer thereof is embossed with a heterogeneous holographic effect or kinetic image (7) containing within it an additional holographic bar-code, or a printed bar code.

Figure 1B:
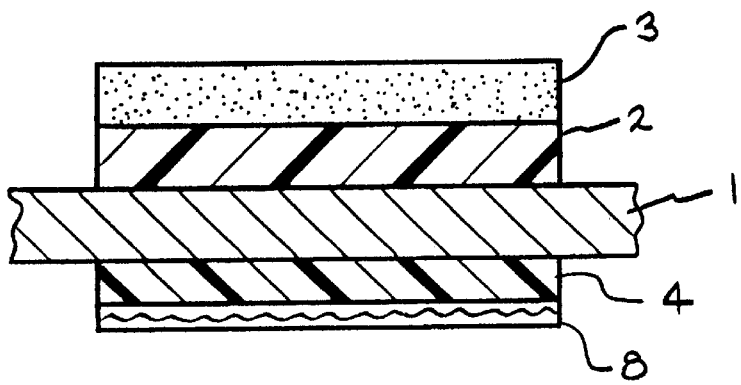

In FIG. 1B, where the second foil (4) is NovaVision® composite sheet the capacitor stamped from the metal layer thereof is embossed with a heterogeneous holographic effect or kinetic image containing within it an additional holographic two-dimensional bar code (8).

Figure 1C:
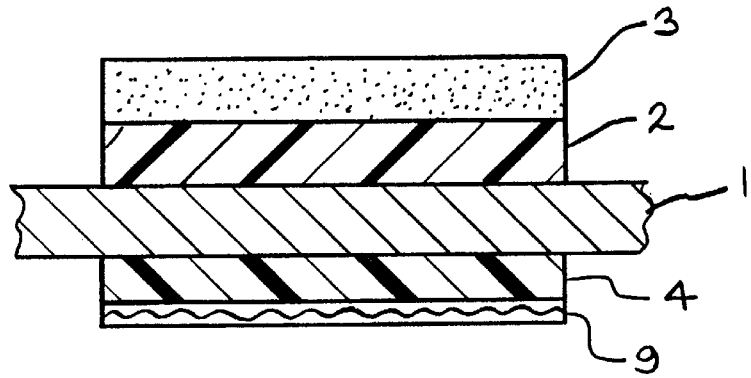

In FIG. 1C, where the second foil (4) is NovaVision® composite sheet, the capacitor stamped from the metal layer thereof is embossed with a heterogeneous holographic effect or kinetic image containing within it an additional hologram (9) containing a multitude of high-density optical information and commands.

Figure 1D:
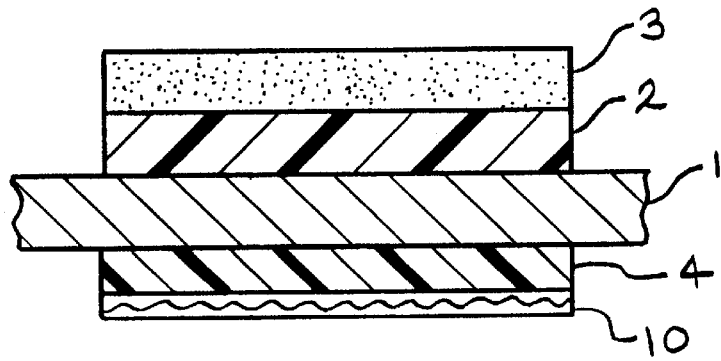

In FIG. 1D, where the second foil is formed from NovaVision® composite sheet, the capacitor stamped from the metal layer thereof is embossed with a heterogeneous holographic effect or image containing within it an additional hologram (10) containing high-density digitized and optical commands to interface with computers or printed high-density digitized optical commands to interface with computers.

Figure 1E:
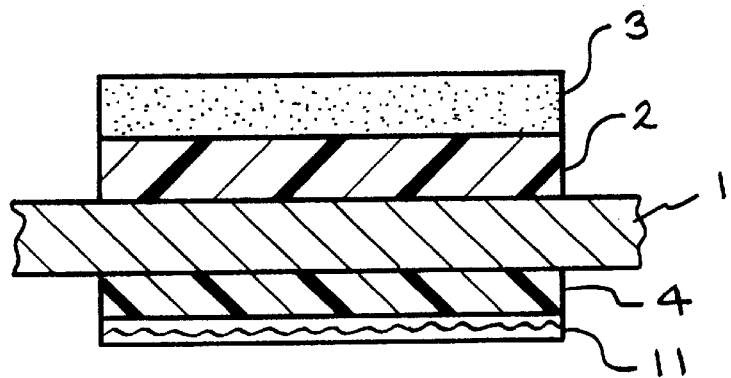

In FIG. 1E, where the second foil is formed from NovaVision® composite sheet, the capacitor stamped from the metal layer thereof is embossed with a heterogeneous holographic effect or image containing within it an additional hologram (11) containing complex script scannable by an optical scanner.

Figure 2:
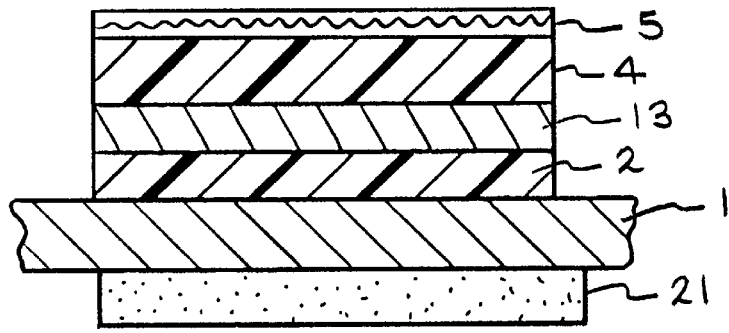
FIGS. 2 and 2A through 2E show additional embodiments of the EAS device of the present invention utilizing two layers of composite sheet or stamping foil on the same side of a supporting sheet.

Referring to FIG. 2, a supporting substrate of film or paper (1) has stamped thereon a first foil (2) of NovaVision® composite sheet, conventional hot or cold stamping foil, or high conductivity stamping foil is stamped such that the metal layer thereof forms the shape of a radio frequency (RF) resonator (antenna). A dielectric coating (13) is printed, coated, laminated or stamped onto the surface of the RF resonator/antenna and those portions of the substrate (1) not covered by such RF resonator/antenna. A second foil (4) which may be NovaVision® composite sheet, conventional hot or cold stamping foil, or high conductivity stamping foil, is stamped onto the dielectric coating (13) such that the stamped portion of the metal layer thereof is adhered to the dielectric coating (13) in the shape of and functions as a capacitor. In those instances where the second foil (4) is NovaVision® composite sheet, it may then be embossed with holographic or kinetic images (5). A self adhesive carrier (21) is applied to the reverse side of the supporting substrate (1).

In FIGS. 2A, 2B, 2C, 2D and 2E show similar layer to layer structures as that of FIG. 2 but show other features added thereto.

Figure 2A:
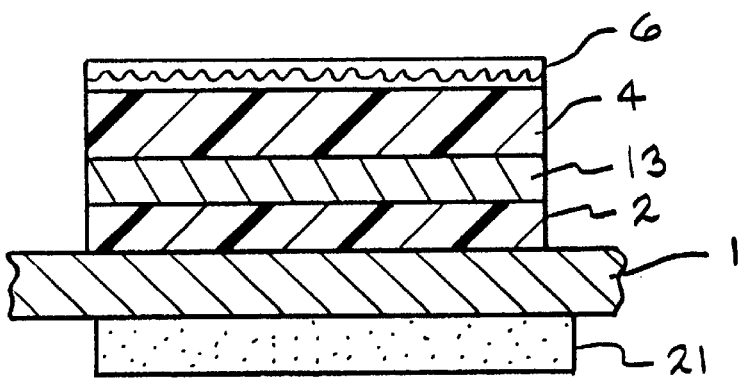

In FIG. 2A, in those instances where the second foil (4) is NovaVision® composite sheet, it may then be embossed with a holographic or kinetic image containing within it a European Article Numbering (EAN) or Universal Product Code (UPC) bar code (6).

Figure 2B:
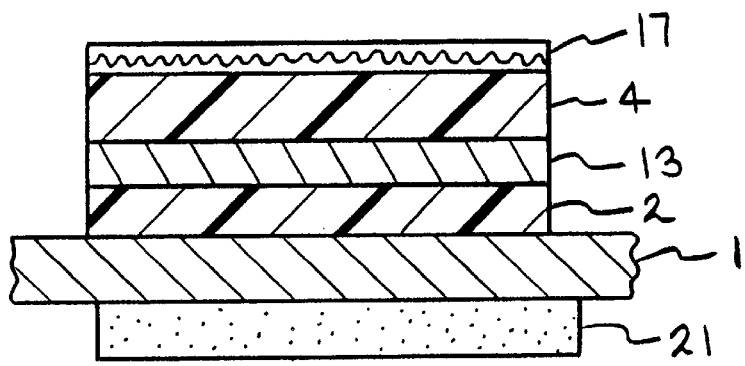

In FIG. 2B, in those instances where the second foil (4) is NovaVision® composite sheet, it may then be embossed with a holographic or kinetic image containing within it in additional holographically generated (2D) two dimensional bar code (17).

Figure 2C:
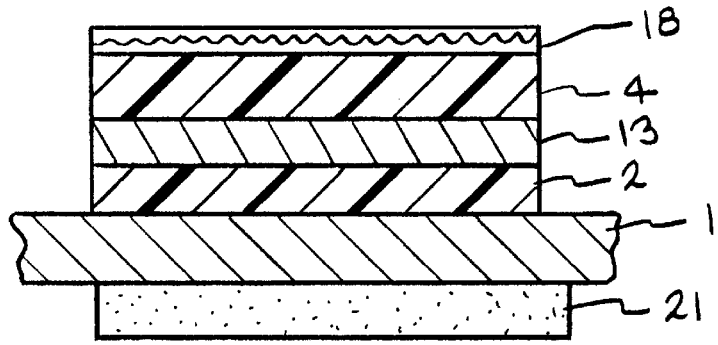

In FIG. 2C, in those instances where the second foil (4) is NovaVision® composite sheet, it is then embossed with a holographic or kinetic image containing within it an additional hologram containing a multitude of high-density optical information (18).

Figure 2D:
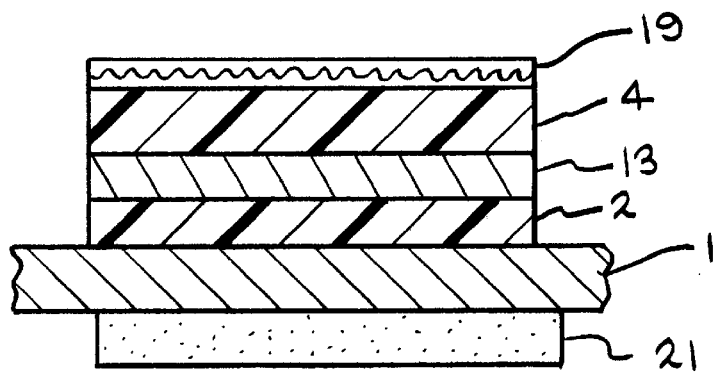

In FIG. 2D, in those instances where the second sheet (4) is NovaVision® composite sheet, it is then embossed with a holographic or kinetic image containing within it an additional hologram containing high-density digitized and optical commands (19) to interface with computers.

Figure 2E:
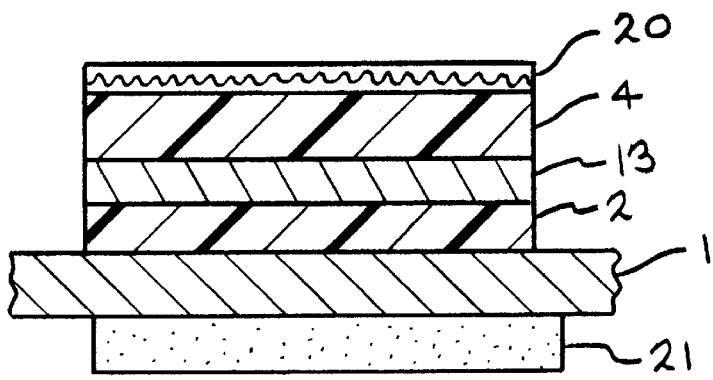

In FIG. 2E, in those instances where the second foil (4) is NovaVision® composite sheet, it is then embossed with a holographic or kinetic image containing within it an additional hologram containing complex script (20) scannable by an optical scanner.

FIG. 3 is an exploded perspective view of an in-line produced RF EAS resonator tag (20) with integrated hologram. The tag (20) comprises a substrate (21), an RF resonator/antenna (22) stamped onto the substrate (21) from a first foil such as that identified by numeral (2) of FIGS. 1 and 2, dielectric layer (23), capacitor plate (24) stamped onto the dielectric layer (23) from a second foil such as that identified by the numeral (4) of FIGS. 1 and 2, and a NovaVision® composite sheet (25) having a hologram (25a) embossed thereon. Additionally, the NovaVision® composite sheet has interruptions (25b), exaggerated here for clarity, formed in the metal layer of such sheet. In lieu of a NovaVision® composite sheet (25) with a hologram embossed thereon, a conventional hot or cold stamping foil or metallized packaging material could be utilized with other decorative material or bar code embossed or printed thereon. In each case, the NovaVision® composite sheet (25), stamping foil, or metallized packaging material is modified by the introduction of periodic interruptions (25b) in the metal layer of such NovaVision® composite sheet, conventional hot or cold stamping foil or metallized packaging material. The interruptions (25b) or breaks are preferably narrow enough to be invisible to the human eye, but wide enough to greatly reduce the electrical conductivity of the NovaVision® composite sheet (25) or other foil. Preferably the interruptions should have a spacing on the order of one (1) centimeter in both the X and Y axes to divide the metal layer into small, non-continuous areas. Said interruptions (25b) or breaks result in transparency of the NovaVision® composite sheet (25) or other foil to electromagnetic radiation in the radio frequency range and compatibility between the NovaVision® composite sheet (25) or other foil and the remaining portions of the RF EAS resonator tag (20). Electrical contact between capacitor (24) pad (24b) and the pad (22b) of antenna (22) may be accomplished as shown in FIGS. 4A, 4B, 5A, 5B.

Figure 4A:
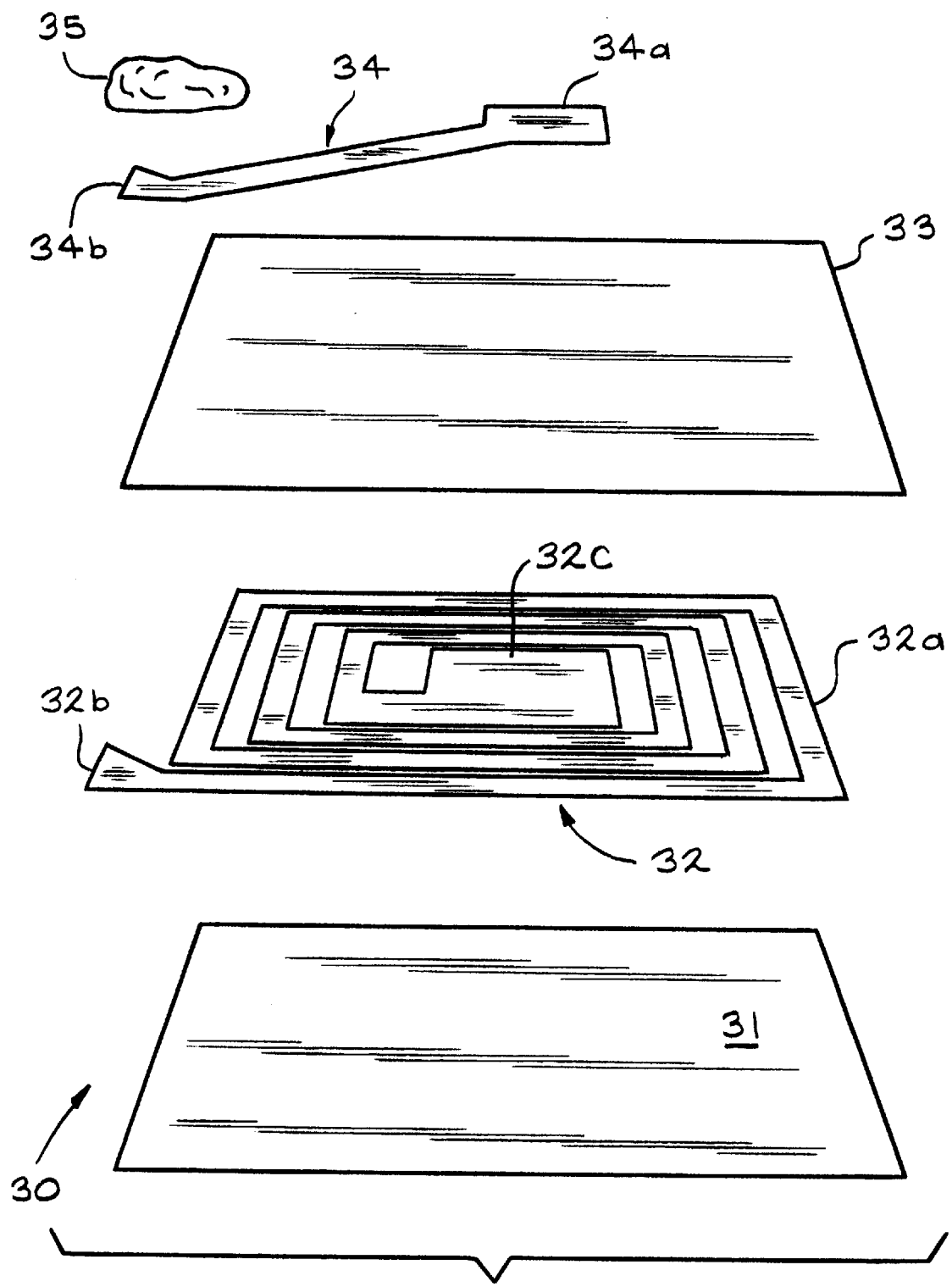

FIG. 4A is an exploded perspective view of an RF EAS tag (30) showing electrical contact established between contact pad (32b) of antenna/conductive element (32) and the contact pad (34b) of a second conductive element (34). The antenna/conductive element (32) includes a coil (32a), a pad (32b) and a first capacitor plate (32c). The second conductive element (34) includes a second capacitor plate (34a) and a pad (34b). A dielectric layer (33) is positioned between the antenna conductive element (32) and the second conductive element (34). The electrical contact is established by printing or otherwise applying an overlapping layer of conductive ink (35) over a portion of substrate (31), contact pad (32b), a portion of dielectric layer (33) and the second capacitor contact pad (34b). The dielectric layer (33) is sized such that the entire second conductive element (34) is supported on the dielectric layer 33 thereby avoiding any electrical discontinuity that may result from stamping the conductive element (34) over the edge of the dielectric layer (33) thereby bending or otherwise disrupting the conductive element (34). Contact is then established by printing or otherwise applying conductive ink (35) to link the contact pad (32b) of antenna/conductive element (32) and the second capacitor plate contact pad (34b).

Figure 4B:
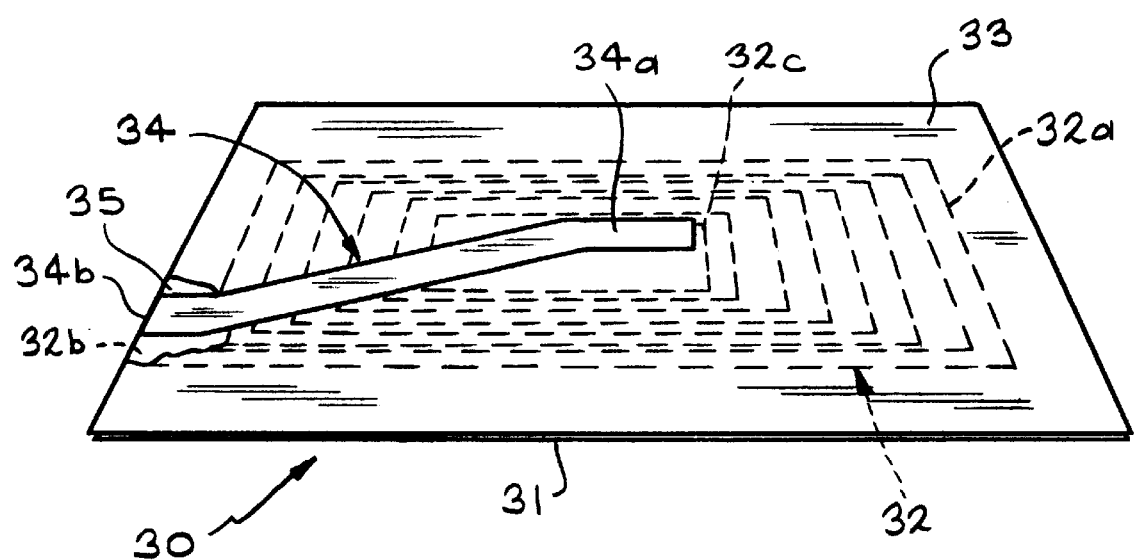

FIG. 4B is a perspective view of the assembled components from FIG. 4A to form the assembled RF EAS tag (30). As can be seen, electrical contact has been established between the contact pad (32b) of antenna conductive element (32) and the contact pad (34b) of the second conductive element (34). This was accomplished by applying conductive ink (35) to overlap the second capacitor contact pad (34b), a portion of the dielectric layer (33) and the contact pad (32b). The conductive ink (35) laps over and around the edge of dielectric layer (33) to join the contact pad (32b) with the contact pad (34b) of the second conductive element (34).

Figure 5A:
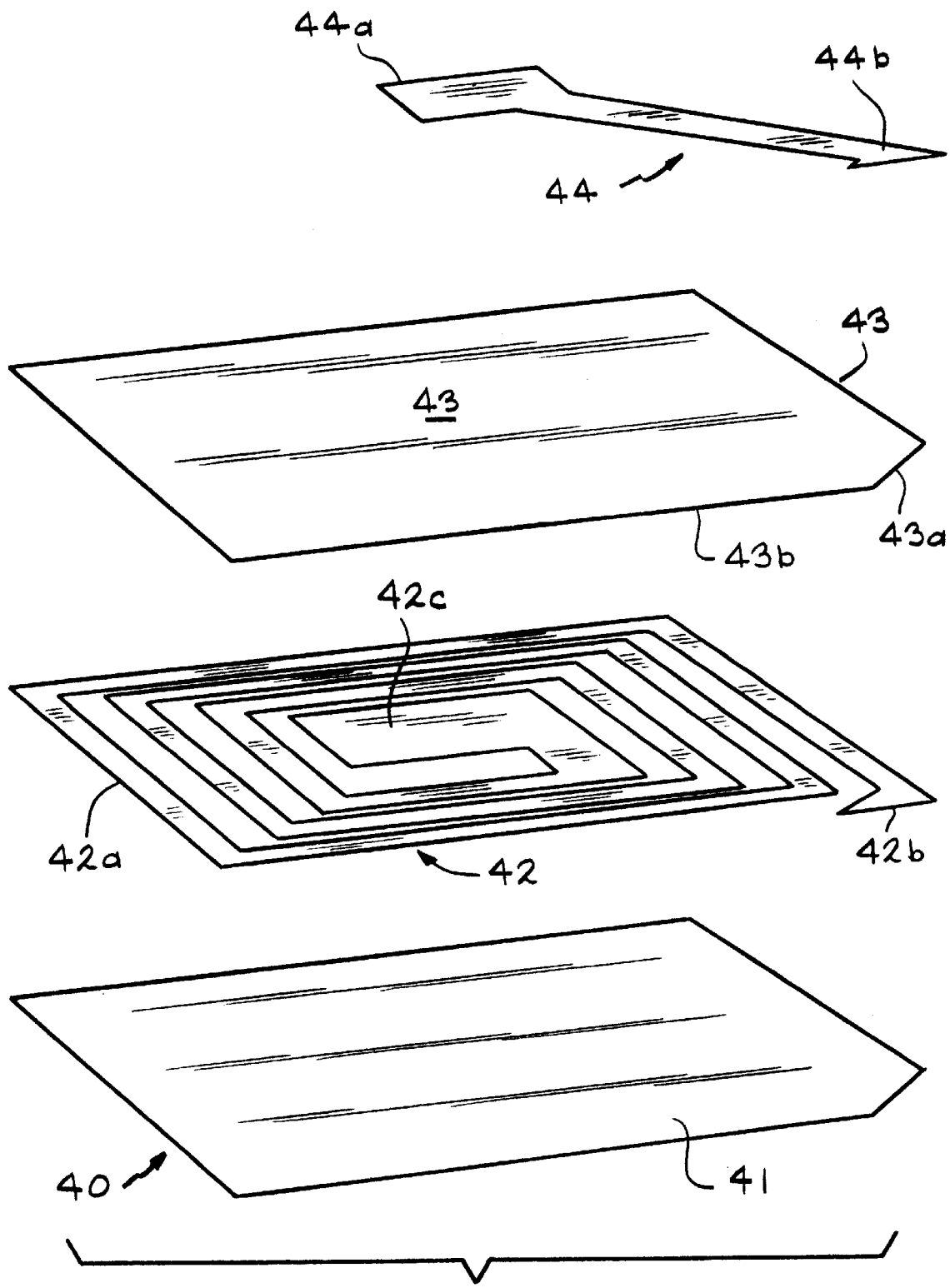

FIG. 5A is an exploded perspective view of another embodiment of RF EAS tag (40). In this embodiment, electrical contact s established between contact pad (42b) of antenna/conductive element (42) and contact pad (44b) of a second conductive element (44). A dielectric layer (43) is positioned between the antenna/conductive element (42) and the second conductive element (44). The antenna/conductive element (42) includes a coil (42a), extending between the pad (42b) and a capacitor plate (42c) stamped or otherwise affixed to substrate (41). The antenna/conductive element (42) is formed by stamping or otherwise transferring that portion of the metal layer having the desired shape of the antenna/conductive element (42) from a NovaVision® composite sheet, conventional hot or cold stamping foil or high conductivity stamping foil to the substrate (41).

The dielectric layer (43) is affixed to the antenna/conductive element (42) and the underlying substrate 41. The dielectric layer (43) is shown as being generally rectangular but having a cut corner defining a tapered edge (43a) extending between adjacent edges (43b) and (43b). The dielectric sheet is sized to overlay the antenna/conductive element (42) in all areas except the tapered edge (43a). In the area of the tapered edge (43a) the pad (42b) of the antenna/conductive element (42) extends outwardly therebeyond.

The second conductive element (44) is formed in a similar manner as the antenna/conductive element (42) by stamping or otherwise transferring the desired shaped portion of one of the specified foils to the dielectric layer (43).

As may be seen in the drawings, all portions of the second conductive element (44) except the pad (44b) are contained within the boundaries of the dielectric layer (43). The pad (44b) extends outwardly beyond the tapered edge (43a). The dielectric layer (43) is positioned between the conductive element (42) and the conductive element (44).

By restricting the area of the dielectric layer (43) in the corner defined by the tapered edge (43a) adjacent the pad (42b) of the conductive element (42) and the pad (44b) of the second conductive element (44), it is possible to have direct contact between such pads (42b) and (44b). This embodiment is useful in cases where the second capacitive element (44) is manufactured to be sufficiently robust that conductivity will not be broken by printing or applying the contact pad (44b) over the edge of the dielectric layer (43). Electrical contact between the contact pad (42b) and the contact pad (44b) is established by direct physical contact, achieved by limiting the coverage of the dielectric layer (43) to all regions of the antenna (42) and second conductive element (44) other than in the area of the contact pads (42b) and (44b).

The second conductive element (44) has a second capacitor plate (44a) at the opposite end from the pad (44b).

Figure 5B:
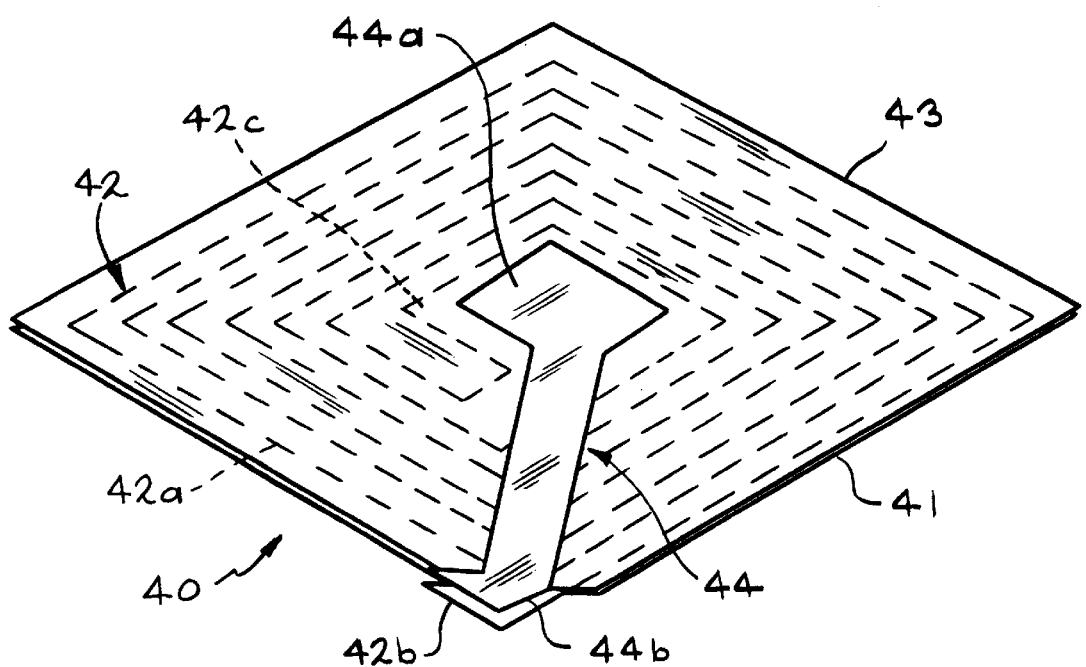

FIG. 5B is a perspective view of the assembled RF EAS tag (30) showing electrical contact established between pad (42b) and second contact pad (44b) made by leaving the corner of dielectric layer (43) defined by tapered edge (43a) absent or cut away to allow direct contact between contact pad (42b) and contact pad (44b). The second contact pad (44b) material must be sufficiently robust to allow application over the edge of dielectric layer (43) without disruption of electrical conductivity.

The dielectric layer (43) or coating may be comprised, for example, of high density polyethylene, polyester, or other polymer material in the cases where it is applied, rather than printed. In the cases where the dielectric layer (43) or coating is a printed component, it may be comprised of ink with consistent dielectric properties, low dielectric loss factor, and of such a nature that it may be applied with highly consistent thickness to maintain accurate capacitance of the capacitor component. Solvent based inks with high solids content and no carbon black or other conductive pigments fulfill these requirements.

Referring to FIG. 6 and its related FIGS. 6A, 6B, 6C and 6D, there is shown schematically apparatus for forming the security device of the present invention in an in-line production operation. It will be described in relation to the RF tag (40) of FIGS. 5A and 5B. As shown in FIG. 6, substrate material (41) contained on a supply reel (101) may be fed along a path in the direction of arrow P through a plurality of workstations to be hereinafter described, to a wind-up reel (104) for collecting and storing a supply of RF security tag material in continuous web form (105) resulting from processing through the various stations shown in FIG. 6. The security tag web material (105) contained in the wind-up roll (104) is in roll form and can be simply trimmed or stamped to size to form the individual security tags of the present invention such as those designated by the numeral 40 in FIG. 5 or such as those of other embodiments of the present invention.

As shown in FIG. 6, the substrate (41) which may be paper or a dielectric film such as oriented polypropylene or polyester may be fed between a pair of nip rollers (51) and (52) after being passed over an idler roller (53). A layer of composite sheet or foil (2), such as that described with reference to FIG. 1, from supply reel (54) is engaged to the upper surface (as shown in FIG. 6) of the substrate (41) prior to its passing between the nip rollers (51, 52).

The upper roller (51) may have a die face having a configuration such as that designated by the numeral 42 in FIG. 6A such that when the composite sheet or foil (2) is passed between the nip of rollers (51, 52) with its metal layer facing the substrate (41), the die or roller 51, acting under heat and pressure will cause that portion of the metal layer of the composite sheet or foil (2) contacted thereby to be transferred to the substrate (41) as a conductive element (42) having a rectangular coil (42a) with a contact pad (42b) at the outer end and a capacitor plate (42c) at the inner end. With such shape, the conductive element 42 will function as an antenna.

Although FIG. 6 shows the substrate (41) and the composite sheet/foil (2) passing between nip rollers (51, 52), it is possible in place of the nip rollers (51, 52) to utilize a stamping die having a die face with the configuration shown for the antenna/conductive element (42) positioned above the joined composite sheet or foil (2) and substrate (41) and a flat anvil positioned directly below. The die will be heated. When an appropriate length of joined substrate (41) and foil (2) are positioned between the die and anvil, the die will be lowered to stamp the joined substrate (41) and composite sheet/foil (2) between it and the anvil under heat and pressure from the heated die to transfer a metallic layer from the composite sheet/foil (2) in the shape of the antenna/conductive element (42) onto the substrate (41). As will be appreciated, during the interval at which the die is in contact with the anvil, there will be no relative longitudinal movement between the die and the joined substrate (41) and composite sheet/foil (2). This can be accomplished either by temporarily stopping movement of the joined substrate (41) and foil (2) during the stamping operation or moving the die and anvil longitudinally at the same rate of speed as the joined substrate (41) and foil (2) during the interval that the die is stamping the joined foil (2) to the substrate (41) and anvil. The utilization of a reciprocating members for stamping to moving stock is well known in the art and forms no part of the present invention. For example U.S. Pat. No. 5,618,378.

Following transfer of the antenna/conductive element (42) to the substrate (41), the remaining portion or remnant of the foil, namely, that portion of the foil (2) minus the portion of the metal layer forming the antenna/conductive element (42) will be wound on a take-up reel 80 as scrap.

FIG. 6A shows the appearance of a segment of the partially formed resonant tag as viewed from the top immediately following removal of the remnant portion of the foil being wound on the take-up reel (80).

The substrate (41) with the antenna/conductive element (42) stamped thereon then passes between the nip of a pair of rollers (55) and (56) immediately following which a dielectric layer (43) in the form of dielectric film or coating is applied onto the surface of the antenna/conductive element (42). As shown in FIG. 6, the dielectric layer (43) is in the form of a film released from a supply reel (57) and moved between the nip of rollers (58) and (59) which adhere the dielectric layer (43) to the antenna/conductive element (42) and substrate (41). In lieu of dielectric film, the dielectric layer (43) could be printed or stamped as a film or coating of dielectric ink or other dielectric material.

FIG. 6B shows the appearance of a segment of the partially formed resonant tag immediately following application of the dielectric layer (43).

The substrate (41) with the antenna/conductive element (42) and dielectric layer (43) overlay affixed thereto then passes through the nip of rollers (65) and (66). After leaving the rollers (65, 66), a second composite sheet or foil (4) of the type described with reference to FIG. 1 is dispensed from supply reel (60) and positioned over the dielectric layer (43) following which it is passed through rolls functioning as a stamping die (63), anvil (64) combination or a reciprocating die and anvil. The foil (4) has a metal layer facing the dielectric layer (43). The stamping die (63) is configured to form a second conductive element (44) and may have a configuration such as that shown in FIG. 6C. The die 63 is heated and, when rolled or stamped against the anvil (64) with the foil (4) joined to the dielectric coating (43), the heat and pressure will cause those portions of the metal layer of such foil (4) to adhere to the dielectric coating (43) to form the second conductive element (44). The second conductive element (44) has a capacitor plate (44a) and a contact pad (44b). The contact pad (44b) of the second conductive element (44) is joined to the contact pad (42b) of the antenna/conductive element (42). The joining of the contact pad (44b) to the contact pad (42b) may be accomplished either by trimming, having pre-trimmed areas or otherwise eliminating a small portion of the dielectric layer (43) in the corner area adjacent contact pad (44b) such as that defined by tapered edge (43a) in FIG. 5A to permit direct contact of the pads (42b) and (44b) as shown in FIGS. 5A and 5B or having a conductive ink effect such contact between the pads (42b) and (44b) as described in FIGS. 4A and 4B.

Following transfer of the second conductive element (44) to the dielectric coating (43), the remaining portion or remanent of the foil, namely, that portion of the foil (4) minus the portion of the metal layer forming the second conductive element (44), will be wound on a take-up reel (81) as scrap.

In those embodiments which utilize NovaVision® composite sheet of the type disclosed in U.S. Pat. No. 5,464,690 for foil (4), the joined second conductive element (44), dielectric coating (43), antenna/conductive element (42) and substrate (41) are then passed between a stamping die (73) and anvil (74). The stamping die (73) has had a holographic image formed therein such that upon stamping of the heated stamping die (73) against a selected portion of such structure, for example, the capacitor pad (44a), a hologram (H) may be embossed therein. With this operation, the RF tag is completed except for cutting from the continuous web (105) which may be wound on the wind-up reel (104) after passing between additional nip rollers 76, 77 and over an idler roller 78.

FIG. 6D shows the appearance of the formed RF tag segment (105a) immediately after leaving the station for embossing the hologram.

In those instances in which the NovaVision® composite sheet or other foil suitable for receiving a hologram is not utilized, the web (105) having conventional foil may be transferred directly from the station at which the stamping die 63, anvil 64 stamped the second conductive element (44) to the wind-up roll 104.

If desired, a portion of the stamping die (73) or other stamping die or roller may be utilized to print or emboss EAN, UFC bar code, holographically generated two dimensional bar code, high-density digitized and/or optical information or complex script to the capacitor pad (44a) or intermittently to other portions of the web (105).

If desired, a third sheet of foil such as that shown in FIG. 3 and designated by the numeral (25) may be applied over the second conductive element (44) and the underlying dielectric layer (43). The third sheet of foil (25) is preferably a NovaVision® composite sheet and has a hologram (25a) embossed therein and a series of interruptions (25b) in the metal layer. A section of an RF tag of this embodiment is shown in FIG. 7.

Many modifications will become readily apparent to those skilled in the art. Accordingly, the scope of the present invention should be determined only by the scope of the claims.

We claim:

1. A length of security tags formed in a substantially continuous, in-line operation comprising
   (a) a web of substrate material;
   (b) a plurality of spaced apart first conductive elements successively affixed to said substrate material by successively transferring a discrete portion of a metal layer of a first composite sheet or foil to said substrate;
   (c) a layer of dielectric material affixed to said first conductive elements and said substrate; and
   (d) a plurality of second conductive elements successively affixed to said dielectric material by successively transferring a discrete portion of a metal layer of a second composite sheet or foil to said dielectric material, a portion of said second conductive elements having a holographic image formed therein.

2. A length of security tags formed in a substantially continuous, in-line operation comprising
   (a) a web of substrate material;
   (b) a plurality of spaced apart first conductive elements successively affixed to said substrate material by successively transferring a discrete portion of a metal layer of a first composite sheet or foil to said substrate;
   (c) a layer of dielectric material affixed to said first conductive elements and said substrate; and
   (d) a plurality of second conductive elements successively affixed to said dielectric material by successively transferring a discrete portion of a metal layer of a second composite sheet or foil to said dielectric material, a portion of said second conductive element having formed therein a holographic image and one member selected from the group consisting of (i) a bar code, (ii) high density optical information and commands, (iii) high density digitized and optical commands, and (iv) complex script scannable by an optical scanner.

3. A length o f security tags formed in a substantially continuous, in-line operation comprising
   (a) a web of substrate material;
   (b) a plurality of spaced apart first conductive elements successively affixed to said substrate material by successively transferring a discrete portion of a metal layer of a first composite sheet or foil to said substrate;
   (c) a layer of dielectric material affixed to said first conductive elements and said substrate;

(d) a plurality of second conductive elements successively affixed to said dielectric material by successively transferring a discrete portion of a metal layer of a second composite sheet or foil to said dielectric material; and (e) a third composite sheet or foil affixed to said second conductive elements, said third composite sheet or film having a metal layer with a plurality of interruptions, at least some portion of which overlie said second conductive elements.

4. A length of security tags according to claim 3 wherein said third composite sheet has a hologram formed therein.

5. A security tag comprising (a) a composite sheet or foil having a layer of metal, said layer of metal having a series of interruptions, said interruptions having a size and spacing permitting electromagnetic radiation to pass therethrough;

(b) a dielectric layer affixed to said composite sheet or foil;

(c) a first conductive element including a capacitor plate positioned between said composite sheet or foil and said dielectric layer, those portions of said composite sheet or foil and said dielectric layer overlying said first conductive element being in interfacial contact therewith and other portions of said composite sheet or foil being in interfacial contact with said dielectric layer, said first conductive element including a pad;

(d) a second conductive element engaged to the opposite side of said dielectric layer from said first conductive element, said second conductive element including a capacitor plate, a coil and a pad; and (e) means establishing electrical contact between said first conductive element and said second conductive element.

6. A security tag according to claim 5, wherein said layer of metal has a hologram thereon.

7. A security tag according to claim 5, wherein one of said first conductive element capacitor plate and said second conductive element capacitor plate has a hologram thereon.

8. A security tag according to claim 5 wherein said security tag is one of a length of security tags formed in a substantially continuous, in-line operation wherein each said first conductive element is applied to a substrate forming part of a continuous web by transferring, under pressure, a discrete portion of a metal layer from a length of first composite sheet or film and each said second conductive element is applied to said dielectric layer by transferring, under pressure, a discrete portion of a metal layer from a length of a second composite sheet or film.

9. A security tag according to claim 8, wherein the untransferred portion of said first composite sheet or film is removed from said substrate prior to the transfer of said second conductive element to said dielectric layer.

10. A security tag according to claim 5, wherein said capacitor plate has a holographic image embossed therein.

11. A security tag according to claim 5, wherein said capacitor plate has (i) a holographic image embossed therein and (ii) a European article numbering or universal product bar code embossed therein.

12. A security tag according to claim 5, wherein said capacitor plate has (i) a holographic image embossed therein and (ii) a holographic two-dimensional bar code embossed therein.

13. A security tag according to claim 5, wherein said capacitor plate has (i) a holographic image embossed therein and (ii) a plurality of high density optical information and commands embossed therein.

14. A security tag according to claim 5, wherein said capacitor plate has (i) a holographic image embossed therein and (ii) a hologram containing high density digitized and optical commands embossed therein.

15. A security tag according to claim 5, wherein said capacitor plate has (i) a holographic image embossed therein and (ii) a hologram containing complex script scannable by an optical scanner.

16. A security tag comprising (a) a composite sheet having a layer of metal with a hologram embossed thereon, said layer of metal having a series of interruptions, said interruptions having a size and spacing permitting electromagnetic radiation in the radio frequency range to pass therethrough;

(b) a dielectric layer affixed to said composite sheet;

(c) a first conductive element including a capacitor plate positioned between said composite sheet and said dielectric layer, those portions of said composite sheet and said dielectric layer overlying said first conductive element being in interfacial contact therewith and other portions of said composite sheet being in interfacial contact with said dielectric layer, said first conductive element including a pad; and (d) a second conductive element engaged to the opposite side of said dielectric layer from said first conductive element, said second conductive element including a capacitor plate, a coil and a pad, said pad extending outwardly beyond said dielectric layer and being engaged to said first conductive element.

17. An article comprising (a) a substrate:

(b) a first conductive element transferred to said substrate from a first film selected from the group consisting of a hologram embossable composite sheet, a hot stamping foil, a cold stamping foil and a high conductivity stamping foil, said first conductive element including a capacitor, a coil and a pad;

(c) a layer of dielectric film engaged to said substrate and said first conductive element;

(d) a second conductive element transferred to said dielectric film, said second film selected from the group consisting of a hologram embossable composite sheet, a hot stamping foil, a cold stamping foil and a high conductivity stamping foil, said second conductive element having a capacitor and a pad joined thereto; and (e) means establishing electrical contact between said first conductive element pad and said second conductive element pad characterized in that one of said capacitors has a holographic image stamped thereon.

18. An article according to claim 17, wherein said one capacitor has a European article numbering or universal product bar code formed thereon.

19. An article comprising (a) a substrate;

(b) a first conductive element transferred to said substrate from a first film selected from the group consisting of a hologram embossable composite sheet, a hot stamping foil, a cold stamping foil and a high conductivity stamping foil, said first conductive element including a capacitor, a coil and a pad;

(c) a layer of dielectric film engaged to said substrate and said first conductive element;

(d) a second conductive element transferred of said dielectric film, said second film selected from the group consisting of a hologram embossable composite sheet, a hot stamping foil, a cold stamping foil and a high conductivity stamping foil, said second conductive element having a capacitor and a pad joined thereto;

(e) means establishing electrical contact between said first conductive element pad and said second conductive element pad; and (f) a hologram embossable composite sheet having a layer of metal with interruptions, said composite sheet engaged to said second conductive element and having a hologram formed thereon.

20. An article comprising (a) a substrate;

(b) a first conductive element transferred to said substrate from a first film selected from the group consisting of a hologram embossable composite sheet, a hot stamping foil, a cold stamping foil and a high conductivity stamping foil, said first conductive element including a capacitor, a coil and a pad;

(c) a layer of dielectric film engaged to said substrate and said first conductive element;

(d) a second conductive element transferred to said dielectric film, said second film selected from the group consisting of a hologram embossable composite sheet, a hot stamping foil, a cold stamping foil and a high conductivity stamping foil, said second conductive element having a capacitor and a pad joined thereto; and (e) means establishing electrical contact between said first conductive element pad and said second conductive element pad characterized in that one of said capacitors has (i) a holographic image stamped thereon and (ii) a holographic two-dimensional bar code stamped thereon.

21. An article comprising (a) a substrate;

(b) a first conductive element transferred to said substrate from a first film selected from the group consisting of a hologram embossable composite sheet, a hot stamping foil, a cold stamping foil and a high conductivity stamping foil, said first conductive element including a capacitor, a coil and a pad;

(c) a layer of dielectric film engaged to said substrate and said first conductive element;

(d) a second conductive element transferred to said dielectric film, said second film selected from the group consisting of a hologram embossable composite sheet, a hot stamping foil, a cold stamping foil and a high conductivity stamping foil, said second conductive element having a capacitor and a pad joined thereto; and (e) means establishing electrical contact between said first conductive element pad and said second conductive element pad characterized in that one of said capacitors has (i) a holographic image stamped thereon and (ii) a plurality of high density optical information and commands formed thereon.

22. An article comprising (a) a substrate;

(b) a first conductive element transferred to said substrate from a first film selected from the group consisting of a hologram embossable composite sheet, a hot stamping foil, a cold stamping foil and a high conductivity stamping foil, said first conductive element including a capacitor, a coil and a pad;

(c) a layer of dielectric film engaged to said substrate and said first conductive element;

(d) a second conductive element transferred to said dielectric film, said second film selected from the group consisting of a hologram embossable composite sheet, a hot stamping foil, a cold stamping foil and a high conductivity stamping foil, said second conductive element having a capacitor and a pad joined thereto; and (e) means establishing electrical contact between said first conductive element pad and said second conductive element pad characterized in that one of said capacitors has (i) a holographic image stamped thereon and (ii) a hologram containing high density digitized and optical commands formed thereon.

23. An article comprising (a) a substrate;

(b) a first conductive element transferred to said substrate from a first film selected from the group consisting of a hologram embossable composite sheet, a hot stamping foil, a cold stamping foil and a high conductivity stamping foil, said first conductive element including a capacitor, a coil and a pad;

(c) a layer of dielectric film engaged to said substrate and said first conductive element;

(d) a second conductive element transferred to said dielectric film, said second film selected from the group consisting of a hologram embossable composite sheet, a hot stamping foil, a cold stamping foil and a high conductivity stamping foil, said second conductive element having a capacitor and a pad joined thereto; and (e) means establishing electrical contact between said first conductive element pad and said second conductive element pad characterized in that one of said capacitors has (i) a holographic image stamped thereon and (ii) a hologram containing complex script scannable by an optical scanner stamped thereon.

24. A method for forming a security tag comprising the steps of (a) feeding a substrate web substantially continuously along a path;

(b) placing a first composite sheet or foil having a layer of metal in interfacial relationship with said substrate;

(c) transferring discrete portions of said first composite sheet or foil metal layer to said substrate to form a first conductive element having a pad, a capacitor plate and a coil between said pad and said capacitor plate;

(d) removing the portions of said first composite sheet or foil other than said discrete portions from said substrate;

(e) affixing a layer of dielectric material to said substrate and said discrete portions;

(f) placing a second composite sheet or oil having a layer of metal in interfacial relationship with said layer of dielectric material;

(g) transferring selected portions of said second composite sheet or foil metal layer to said dielectric layer to form a second conductive element having a pad, a capacitor plate and a conductive element therebetween;

(h) removing the portions of said second composite sheet or foil other than said selected portions from said dielectric layer; and (i) establishing electrical contact between said first conductive element pad and said second conductive element pad.

25. A method for forming a security tag according to claim 24, wherein the step of establishing electrical contact comprises applying an electrically conductive ink or coating to extend from said first conductive element pad to said second conductive element pad.

26. A method for forming a security tag according to claim 24, wherein said layer of dielectric material is shaped to overlie all of said first conductive element except said pad and said first conductive element pad is in direct contact with said second conductive element pad.

27. A method for forming a security tag according to claim 24, further including the step of forming a holographic image or diffraction grating image on said second conductive element capacitor plate.

28. A method for forming a security tag according to claim 24, further including the step of forming in said second conductive element capacitor plate an indicia selected from the group consisting of (1) two-dimensional bar code, (2) high density optical information, (3) high density digitized commands, and (4) complex script scannable by optical scanner.

29. A method for forming a security tag according to claim 24, further including the step of forming in said second conductive element capacitor plate, a holographic or diffraction grating image and an indicia selected from the group consisting of (1) two-dimensional bar code, (2) high density optical information, (3) high density digitized commands, and (4) complex script scannable by optical scanner.

* * * * *

UNITED STATES PATENT AND TRADEMARK OFFICE
CERTIFICATE OF CORRECTION

PATENT NO. : 6,087,940
DATED : July 11, 2000
INVENTOR(S) : Albert J. Caperna and Mark C. Waterbury It is certified that error appears in the above-identified patent and that said Letters Patent is hereby corrected as shown below:

Column 10, line 58, delete "o f" and insert --of--.

Column 12, line 66, delete "of" and insert --to--.

Signed and Sealed this

Tenth Day of April, 2001

NICHOLAS P. GODICI

*Attest:*

*Attesting Officer*   Acting Director of the United States Patent and Trademark Office